US007434555B2

(12) United States Patent
Okamoto

(10) Patent No.: US 7,434,555 B2
(45) Date of Patent: Oct. 14, 2008

(54) V TYPE INTERNAL COMBUSTION ENGINE

(75) Inventor: Yasuo Okamoto, Iwata (JP)

(73) Assignee: Yamaha Motor Company Ltd, Iwata (JP)

( * ) Notice: Subject to any disclaimer, the term of this patent is extended or adjusted under 35 U.S.C. 154(b) by 190 days.

(21) Appl. No.: 11/380,318

(22) Filed: Apr. 26, 2006

(65) Prior Publication Data

US 2006/0243236 A1 Nov. 2, 2006

(30) Foreign Application Priority Data

Apr. 28, 2005 (JP) ............................. 2005-132807

(51) Int. Cl.
*F01L 1/02* (2006.01)
(52) U.S. Cl. ............... 123/90.31; 123/90.15; 123/90.27
(58) Field of Classification Search ............. 123/90.27, 123/90.31, 90.6, 90.15, 90.16, 90.17, 90.18
See application file for complete search history.

(56) References Cited

U.S. PATENT DOCUMENTS

| 4,974,560 | A | * | 12/1990 | King | 123/90.17 |
| 5,033,421 | A | * | 7/1991 | Shimada et al. | 123/90.27 |
| 5,564,380 | A | * | 10/1996 | Kobayashi et al. | 123/192.2 |
| 6,367,435 | B1 | * | 4/2002 | Okui et al. | 123/90.15 |

FOREIGN PATENT DOCUMENTS

EP 624717 A1 * 11/1994
JP 2003-286854 A 10/2003

OTHER PUBLICATIONS

Patent Abst Japan, Oct. 10, 2003, Honda Motor.

* cited by examiner

*Primary Examiner*—Ching Chang
(74) *Attorney, Agent, or Firm*—Ernest A. Beutler

(57) ABSTRACT

A number of embodiments of double overhead cam shaft V type engines wherein the drive arrangement for the camshafts permits not only a compact design but also one in which the timing loadings are decreased to improve engine life, performance and reduced servicing.

14 Claims, 5 Drawing Sheets

V TYPE INTERNAL COMBUSTION ENGINE

BACKGROUND OF THE INVENTION

The present invention relates to an internal combustion engine having cylinder bank portions arranged in a V-shaped configuration and more specifically to an improved mechanism for driving the respective valve operating camshafts of each of the cylinder bank portions and to provide a more compact engine.

In V type engines and particularly those having pairs of overhead cam shafts for operating the valves of the cylinders of each bank, it is the practice to drive the cam shafts in timed relation to the engine crankshaft at one half crankshaft speed.

Some examples of the way this has been previously done are disclosed in Published Japanese Application 2003-286845(A). As described and illustrated therein, a valve operating camshaft of one of the bank portions is driven by a crankshaft drive gear via an endless timing drive belt. In turn and a second camshaft drive gear shaft is in meshing engagement with the crankshaft drive gear to be driven in a reverse direction. Through the drive of this gear shaft, a valve operating camshaft of the other bank portion is rotated in the direction opposite to the rotation direction of the valve operating camshaft of the one bank portion via another endless timing drive belt.

In addition, the tension applied to the endless timing drive belts of the respective bank portions is adjusted by hydraulic tensioners. Alternatively the hydraulic tensioners are both provided on the inner sides of the V-shaped bank portions or on the outer sides of the V-shaped bank portions.

As a result of this relationship and in order to drive the valve operating camshaft of one of the bank portions, the endless timing drive belt is directly wound around the crankshaft. Expansion or wear thus occurs in the endless timing drive belt due to the influence of variations in crank angle speed, which may cause a deterioration in reliability and durability.

In addition to the aforenoted problem, a speed reduction is required between the drive and driven ends to provide the correct valve timing. Further, due to requirements in terms of the durability, bending loss, and the like of the endless timing drive belt wound on the driven wheel side, there is a practical limitation to the reduction of the diameter of the driven wheel, which makes it difficult to achieve compact construction of the cylinder head.

In addition the offsetting of the axis of one of the camshaft driven wheels relative to the crankshaft axis tends to make the overall engine wider in a direction perpendicular to the crankshaft axis It is, therefore, a principal object of the invention to provide a valve operating structure for an overhead cam V type engine that reduces the stresses on the crankshaft and timing mechanism and which also permits a compact engine construction.

It is a further object of the invention to provide an improved and compact V type engine construction wherein the transverse width of the engine may be reduced even if it employs twin overhead camshafts for each cylinder bank.

SUMMARY OF THE INVENTION

A feature of this invention is adapted to be embodied in a V configuration internal combustion engine comprised of a pair of angularly disposed cylinder blocks each having at least one cylinder bore in which a respective piston is supported for reciprocation. The axes of the cylinder bores intersect at an axis at one end of the cylinder bores. A crankshaft is journalled for rotation about that axis and driven by connecting rods connecting the pistons to the crankshaft. First and second valve operating shafts are disposed on opposite sides of a plane containing the axis for operating valves associated with respective ones of said cylinder bores and are driven by the crankshaft.

In accordance with another feature of the invention, one of the valve operating shafts is driven directly by the crankshaft and the other of the valve operating shafts is directly driven by the one valve operating shaft.

DETAILED DESCRIPTION OF THE ILLUSTRATED EMBODIMENTS

Figure 1:
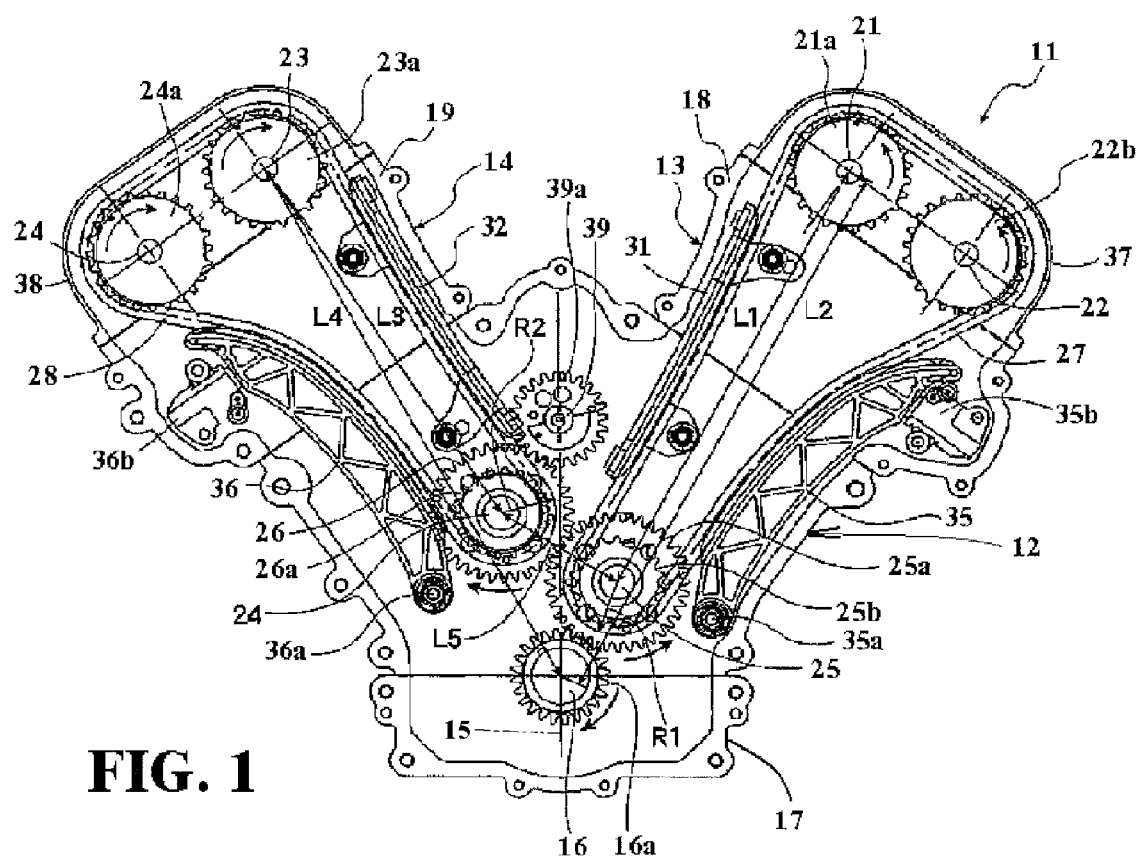
FIG. 1 is a cross sectional view taken through the camshaft drive of a V type engine constructed in accordance with a first embodiment of the invention.

Referring now in detail to the drawings and first to the embodiment of FIG. 1 a V type internal combustion engine constructed in accordance with the invention is identified generally by the reference numeral 11. The engine 11 includes a cylinder block 12 that has a pair of angularly disposed first and second bank portions 13 and 14, each of which defines one or more cylinder bores, not shown. The axes of the cylinder bores of each bank lie in common planes and these planes intersect at a vertically extending plane 15.

As is well known in the art, pistons (not shown) reciprocate in these cylinder bores and are connected by connecting rods (not shown) to drive a crankshaft 16 journalled in a known manner in a crankcase 17 of the V-engine 11. The axis of the crankshaft 16 lies on the vertically extending plane 15 that bisects the planes containing the axes of the cylinder bores.

As is well known in the art, cylinder head assemblies. Indicated generally at 18 and 19, are suitably affixed to the cylinder banks 13 and 14 and close the upper ends of the cylinder bores to form with them and the heads of the pistons the individual combustion chambers (not shown) of the engine 11.

In the upper portion of cylinder head 18 of the first bank portion 13, first and second valve operating camshafts 21 and 22 are journalled in a suitable manner and have formed thereon cams (not shown in this figure but described later by reference to FIG. 3) for driving intake and exhaust valves (not shown).

Further, in the cylinder head 19 of the in the upper portion of the second bank portion 14, second valve operating camshafts 23 and 24 are rotatably journalled in a suitable manner 14 and have formed therein cams for driving respective intake and exhaust valves (not shown). Of the valve operating camshafts 21, 22, 23, and 24, the valve operating camshafts 21 and 23 are on the intake side and operate intake valves, and the valve operating shafts 22 and 24 are on the exhaust side and operate exhaust valves.

As is well known in the art, the valve operating camshafts 21, 22, 23, and 24 are each driven from the drive force of the crankshaft 16 at one half speed of the crankshaft 16. To that end, there is provided a first idler shaft 25 driven by the crankshaft 16, and a second idler shaft 26 driven by the first idler shaft 25. The first idler shaft 25 is a shaft for driving the first valve operating camshafts 21 and 22 of the first bank portion 13 via a first timing drive chain 27, and the second idler shaft 26 is a shaft for driving the second valve operating camshafts 23 and 24 of the second bank portion 14 via a second timing drive chain 28. Of course the chains shown can be readily replaced by belts, if desired.

The crankshaft 16 is provided with a crank gear 16a for driving the first idler shaft 25 through a first idler gear 25a that is fixed thereto. In addition, a first drive sprocket 25b, is fixed coaxially with the first idler gear 25a for driving the first valve operating camshafts 21 and 22 through the first timing chain 27 via respective sprockets 21a and 22a.

Further, a second idler gear 26a is fixed to the second idler shaft 26 and is driven directly by the first idler gear 25a. The second valve operating camshafts 23 and 24 are driven by a second timing chain 28 that is enmeshed with the second idler gear 26a and which engages respective sprockets 23a and 24a fixed thereto. Again, belts may be used in place of the illustrated chain, without departing from the invention.

The overall gear ratio between the crankshaft 16 and the cam shafts 21, 22, 23 and 24 is such that the cam shafts 21, 22, 23 and 24 each rotate at ½ the speed as the crankshaft 16. However, unlike the conventional practice this is not done in a single stage and hence the cam shaft sprockets 21a, 22a, 23a and 24a can be made smaller in diameter thus reducing not only the size of the cylinder heads 18 and 19, but also the complete engine.

To this end, the diameters of first idler gear 25a and the second idler gear 26a is the same but greater than that of the crank shaft drive gear 16a so that the first idler gear 23 and second idler gear 24 decelerate relative to the crankshaft 16. More specifically, the first idler gear 25a and the second idler gear 26a have the same number of teeth, and the gear ratio of the crank gear 16a to the first idler gear 25a is set to one of 1:2, 2:3, 3:4, 4:5, and 5:8. If the aforementioned ratio is other than 1:2 a further reduction will be required between the speeds of the shafts 25 and 26 and the cam shafts 21, 22, 23 and 24.

Further, the first timing drive chain 27 is wound around the first drive sprocket 23b and first driven sprockets 17a and 18a respectively provided at end portions of the first valve operating camshafts 21 and 22, and the second timing drive chain 28 is wound around the second drive sprocket 24b and second driven sprockets 19a and 20a respectively provided at end portions of the second valve operating camshafts 23 and 24.

In the embodiment illustrated, the center distance L1 between the first idler shaft 25 and the first valve operating camshaft 21 is set shorter than the center distance L2 between the crankshaft 16 and the first valve operating camshaft 21. Further, the center distance L3 between the second idler shaft 24 and the second valve operating camshaft 23 is set shorter than the center distance L4 between the crankshaft 16 and the second valve operating camshaft 23. Furthermore, the center distance L1 is set larger than the center distance L3, and the center distance L2 and the center distance L4 are set equal to each other.

In addition to the foregoing, the sum of the winding radius R1 of the first timing drive chain 27 on the first idler shaft 25 and the winding radius R2 of the second timing drive chain 28 on the second idler shaft 24 is smaller than the center distance L5 between the first idler gear 25a and the second idler gear 26a.

A first guide portion 31 and a second guide portion 32 are provided for guiding the timing drive chains 27 and 28 on the inner sides of the cylinder bank portions 13 and 14, respectively. In addition, a first tensioner 35 and a second tensioner 36 are arranged on the outer sides of the bank portions 13 and 14, respectively, for maintaining the desired tension in the timing chains 27 and 28, respectively.

The lower ends of the tensioners 35 and 36 are pivotal on shafts 35a and 36a, respectively and urging devices 35b and 36b are arranged on the upper sides thereof. The upper end portions of the tensioners 35 and 36 are urged toward the timing drive chains 27 and 28 by the urging devices 35b and 36b, respectively. Thus the desired, predetermined tension is thus applied to the timing drive chains 27 and 28 at all times.

A balancer gear 39a of a primary balancer shaft 39 is in meshing engagement with the second idler gear 26a of the second idler shaft 24 and is driven by the second idler gear 26a. The rotational axis 39b of the balancer shaft 39 lies on the plane 15 contiguous to the area where the chain 28 engages the sprocket 26b.

The operation of this embodiment is as follows. When the V-engine 11 is driven and the crankshaft 16 is rotated, the first idler shaft 25 is rotated via the crank gear 16a and the first idler gear 25a. Simultaneously with this, the second idler shaft 24 is rotated via the first idler gear 25a and the second idler gear 26a. At this time, the first and second idler shafts 25 and 24 are rotated at reduced rotational speeds relative to the rotational speed of the crankshaft 16.

Accordingly, the first valve operating camshafts 21 and 22 and the second valve operating camshafts 23 and 24 are rotated via the two timing drive chains 27 and 28, respectively. The rotation of the camshafts 21, 22, 23, and 24 causes the intake and exhaust valves to be opened and close at a predetermined timing via their cams. In addition, the undesired movement of the chains 27 and 28 is suppressed since the timing drive chains 27 and 28 are applied with the predetermined tension by the respective tensioners 35 and 36.

Also, due to the drive of the second idler gear 26a, the primary balancer shaft 39 is rotated in the opposite direction to the crankshaft 16 via the balancer gear 39a, whereby the balance at the time of driving of the V-engine 11 is maintained.

The construction of this embodiment provides a number of advantages over the prior art. For example, since the first and second timing drive chains 27 and 28 are not directly driven by the crankshaft 16 but are driven via the respective idler gears 25a and 26a variations in crank angle speed are absorbed to prevent expansion or wear of the first and second timing drive chains 27 and 28 thereof.

Also, because the rotation speed of the first sprocket 23b and second sprocket 24b is reduced relative to the rotation speed of the crank gear 16 the diameters of the respective driven sprockets 21a, 22a, 23a, and 24a can be made small. Accordingly, the spacing (cam-to-cam pitch) between the center of the first driven sprocket 21a and the center of the second driven sprocket 22a can be made small, whereby the cylinder heads assemblies 21 and 22 including their respective cylinder head covers 15 and 16 can be made compact.

Furthermore, in addition to a drop in the rotation speed of each of the drive sprockets 23b and 24b, the speed of each of the first and second timing drive chains 27 and 28 also decreases to prolong their life.

Further, since the first idler gear 25a and the second idler gear 26a have the same number of teeth, and the gear ratio of the crank gear 16a to the first idler gear 25a is set to one of 1:2, 2:3, 3:4, 4:5, and 5:8, the cam-to-cam pitch can be reduced without increasing the bending loss of the timing drive chains 27 and 28, thereby allowing miniaturization on the size of the cylinder heads 21 and 22.

In addition, since the center distance L1 between the first idler shaft 25 and the first valve operating camshaft 21 is set smaller than the center distance L2 between the second idler shaft 24 and the second valve operating camshaft 23, and the center distance L3 between the second idler shaft 24 and the second valve operating camshaft 29 is set smaller than the center distance L4 between the crankshaft 16 and the second valve operating camshaft 23, the overall length of each of the first and second timing drive chains 27 and 28 can be reduced which further improves the durability and produce longer life without loss of performance.

Yet another advantage, because the primary balancer shaft 39 must be rotated in reverse with respect to the crankshaft 16, it can be brought into meshing engagement with either of the crank gear 16a and the second idler gear 26a. This increases the freedom of layout and because of the adoption of the gear drive system, a phase shift can be made relatively small as compared with the case where a chain drive system is adopted.

Normally the primary balancer shaft 39 is of a type penetrating a case, it is generally arranged between the bank portion 13 and the bank portion 14 relatively high in the engine making it less compact.

Furthermore because the sum of the winding radius R1 of the first timing drive chain 27 on the first idler shaft 25 and the winding radius R2 of the second timing drive chain 28 on the second idler shaft 24 is smaller than the center distance L5 between the fist idler gear 25a and the second idler gear 26a, no interference occurs between the first and second timing drive chains 27 and 28 of the two bank portions 13 and 14. Accordingly, there is no need to provide an offset in the direction of the crankshaft 16, thereby allowing a reduction in length with respect to the direction of the crankshaft 16.

In this embodiment, the first and second tensioners 35 and 36 are arranged on the outer sides of the first and second bank portions 13 and 14, respectively. Therefore, the space between the two tensioners can be increased even when the angle between the bank portions 13 and 14 of the V-engine is narrow.

Figure 2:
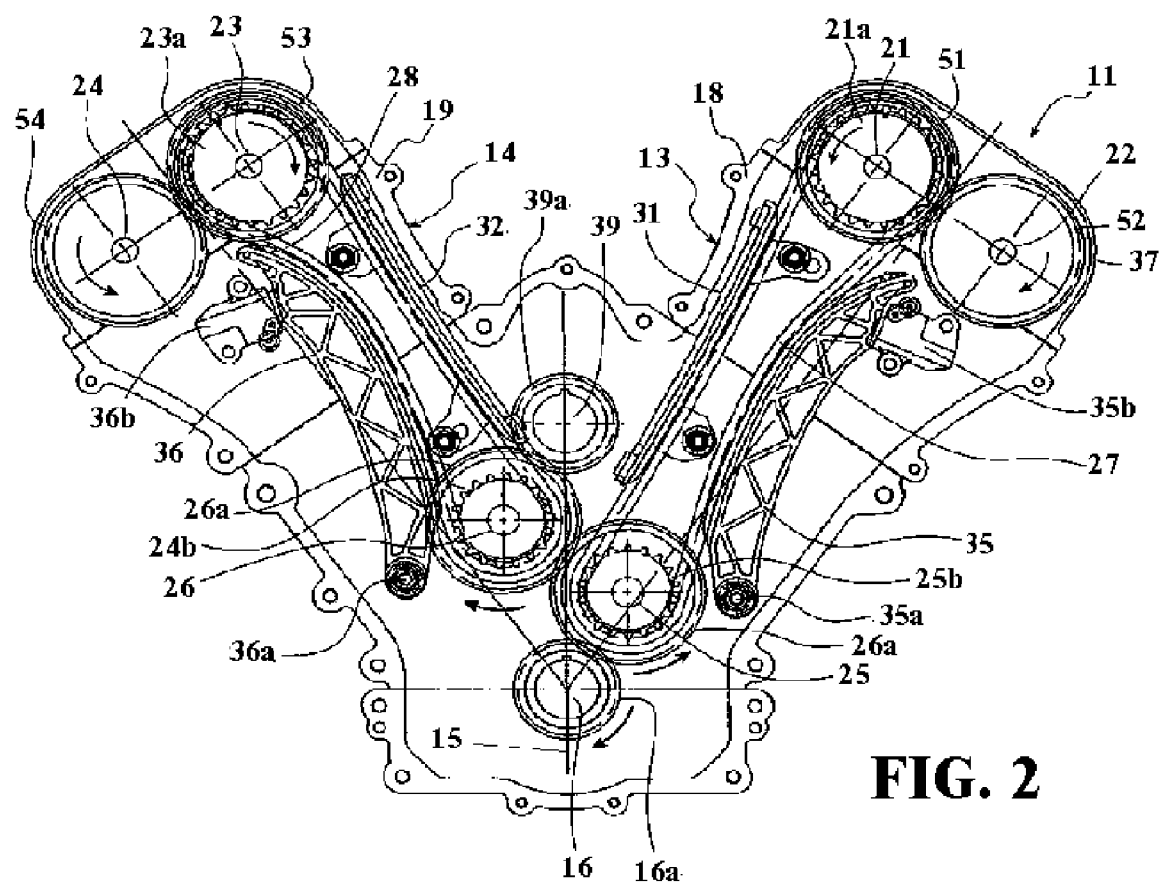
FIG. 2 is a cross sectional view, in part similar to FIG. 1, and shows a second embodiment of the invention.

Embodiment of FIG. 2

Referring now to the embodiment of FIG. 2, it presents several of the advantages of the embodiment already described and provides some additional features. Because of the similarity, components which are the same or generally similar are identified by the same numerals previously employed have been identified by the same reference numerals and will be described further only to make the construction and further advantages of this embodiment clear to those skilled in the art.

The main difference of this embodiment from FIG. 1 resides in the structure for driving the valve operating camshafts 21, 22, 23, and 24. To this end, the first valve operating camshafts 21 and 22 are respectively provided with first intermeshing gears 51 and 52 in meshing engagement with each other, and the second valve operating camshafts 23 and 24 are respectively provided with second valve gears 53 and 54 in meshing engagement with each other.

The first timing drive chain 27 is wound around a first driven sprocket 51 of the first valve operating camshaft 21 on the inner side of the first bank portion 13, and the second timing drive chain 28 is wound around a second driven sprocket 53 of the second valve operating camshaft 23 on the inner side of the second bank portion 14.

According to the construction of this embodiment, when the first and second idler shafts 25 and 24 are driven, the first valve operating camshaft 21 and the first valve operating camshaft 23 of the respective cylinder banks 13 and 14 are rotated in the direction indicated by the arrows via the two timing drive chains 27 and 28, respectively. Then, on the first bank portion 13 side, the drive force of the first valve operating camshaft 21 is transmitted to the second valve operating camshaft 22 from the first valve gear 51 via a second gear 52 fixed thereto causing the second valve operating camshaft 22 to rotate in the direction indicated by the arrow.

In a like manner, on the second bank portion 14 side, the drive force of the second valve operating camshaft 23 is transmitted to the second valve operating camshaft 24 from the first valve gear 53 via a second valve gear 54 fixed thereto causing the second valve operating camshaft 24 to rotate in the direction indicated by the arrow. Thus in this embodiment, unlike the first embodiment, the camshafts associated with each of the banks 13 and 14 rotate in opposite directions rather than in the same direction. Thus in this embodiment, the tensioners 35 and 36 may be positioned closer to the valley between the cylinder banks 13 and 14 than those of embodiment of FIG. 1 thereby making it possible to reduce the outer shape of the V-engine.

This construction also permits the use of shorter chains 27 and 28 since each first timing drive chains 27 is wound around only one of the first valve operating camshafts 21 and 22, and remaining camshaft of the respective bank 13 or 14 is driven by the valve gears 51 and 52, and 53 and 54, respectively. Thus the influence of the expansion of the timing drive chains 27 and 28 between the camshafts 21 and 22 and between the camshafts 23 and 24, respectively, is reduced. This makes it possible to prevent a decrease in performance due to the expansion of the first and second timing drive chains 27 and 28.

Figure 3:
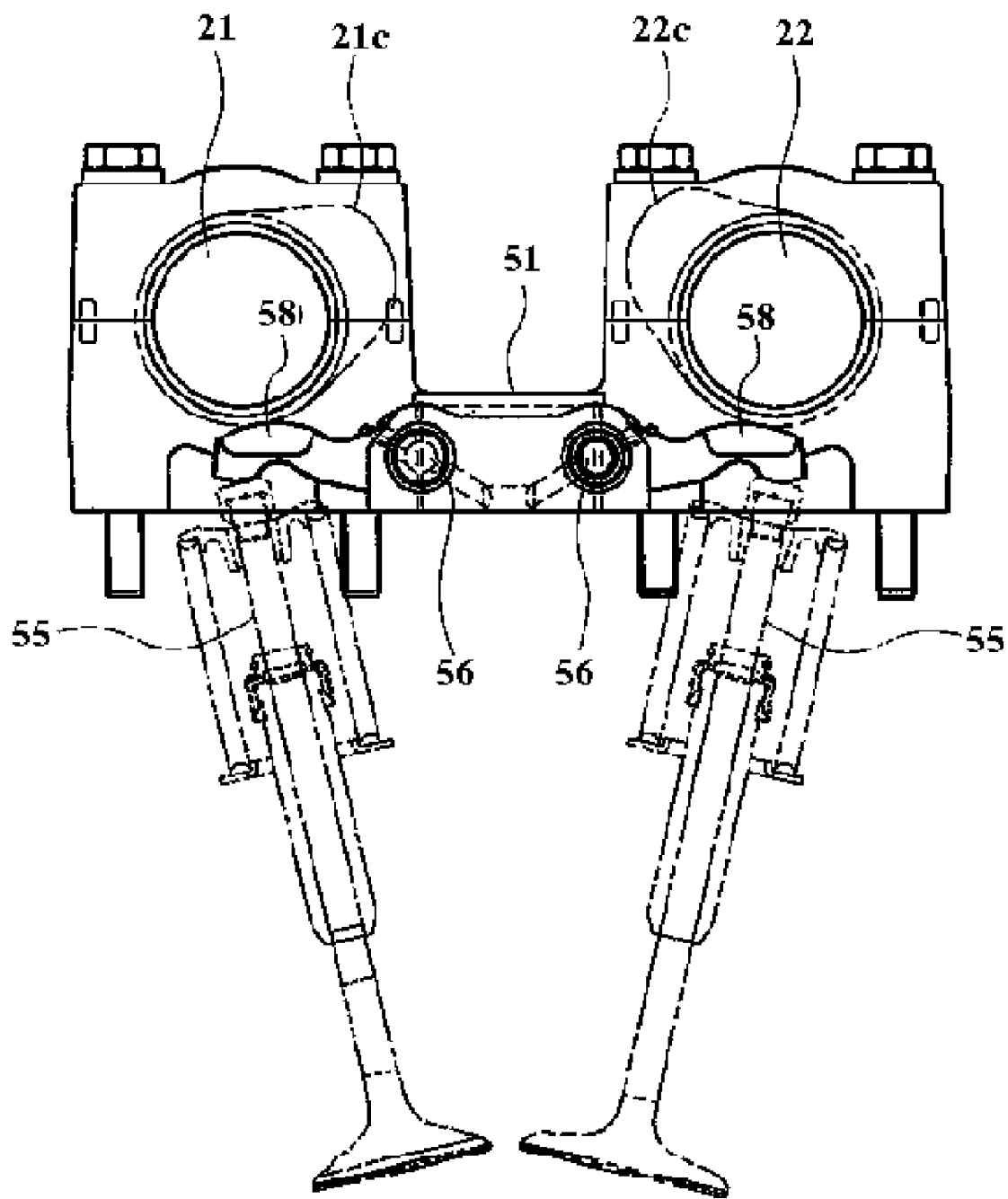
FIG. 3 is an enlarged view looking in the same direction as FIG. 2 and shows a type of valve operating mechanism that can be used with the invention.

Also all the cams formed in the respective valve operating camshafts 21, 22, 23, and 24 rotate from the outside to the inside with respect to the cylinder center. Thus, the fluctuating cam driving torque at high speed rotation in a rocker arm valve system of the inner pivot layout as shown in FIG. 3 is reduced to permit an improvement in terms of the reliability of both the timing drive chains 27 and 28. Specifically, the rocker arm valve system of the inner pivot layout refers to a system in which, as shown in FIG. 3, pivot shafts 33 for rotatably supporting rocker arms 30 on a cam carrier 29 are arranged on the inner sides of the valve operating camshafts 21 and 22. When the valve operating camshafts 21 and 22 are rotated, the rocker arms 30 are pushed by cams 17c and 18c to pivot, whereby on/off valves 34 are made movable to open and close intake and exhaust ports (not shown). At this time, since all the cams 17c and 18c formed in the respective valve operating camshafts 21 and 22 rotate in the direction from the outside to the inside with respect to the cylinder center, the fluctuating cam driving torque can be made small, and the reliability of the timing drive chain 27 can be enhanced.

It should be noted that since the same description applies to the other valve operating camshafts 23 and 24, repetitive description will be omitted. And as has already been noted, this embodiment is otherwise the same as the embodiment of FIG. 1, and therefore further description of this embodiment is not believed necessary for those skilled in the art to understand and practice the invention.

Embodiment of FIG. 3

FIG. 3 is a view showing a construction for operating the engine valves (not previously illustrated, but identified in this figure by the reference numeral 55) from the cam lobes 21b and 22b of the various embodiments described herein. By utilizing this system, it is possible to reduce the fluctuating cam driving torque at high speed rotation in a rocker arm valve system to further improve the reliability of both the timing drive chains 27 and 28.

Specifically, the rocker arm valve system of the inner pivot layout refers to a system, as shown in FIG. 3, embodying pivot shafts 56 for rotatably supporting rocker arms 58 on each of a plurality of cam carriers 57 fixed suitably to the respective cylinder head and each of which journalles the valve camshafts 21 and 22 at the center of the associated cylinder bore.

When the valve camshafts 21 and 22 are rotated, the rocker arms 58 are pushed by the cam lobes 21c and 22c to pivot, whereby valves 55 are operated to open and close intake and exhaust ports (not shown). At this time, since all the cams 21c and 22c formed in the respective valve camshafts 21 and 22 rotate in the direction from the outside to the inside with respect to the cylinder center, the fluctuating cam driving torque can be made small, and the reliability of the timing drive chain 27 can be enhanced.

Figure 4:
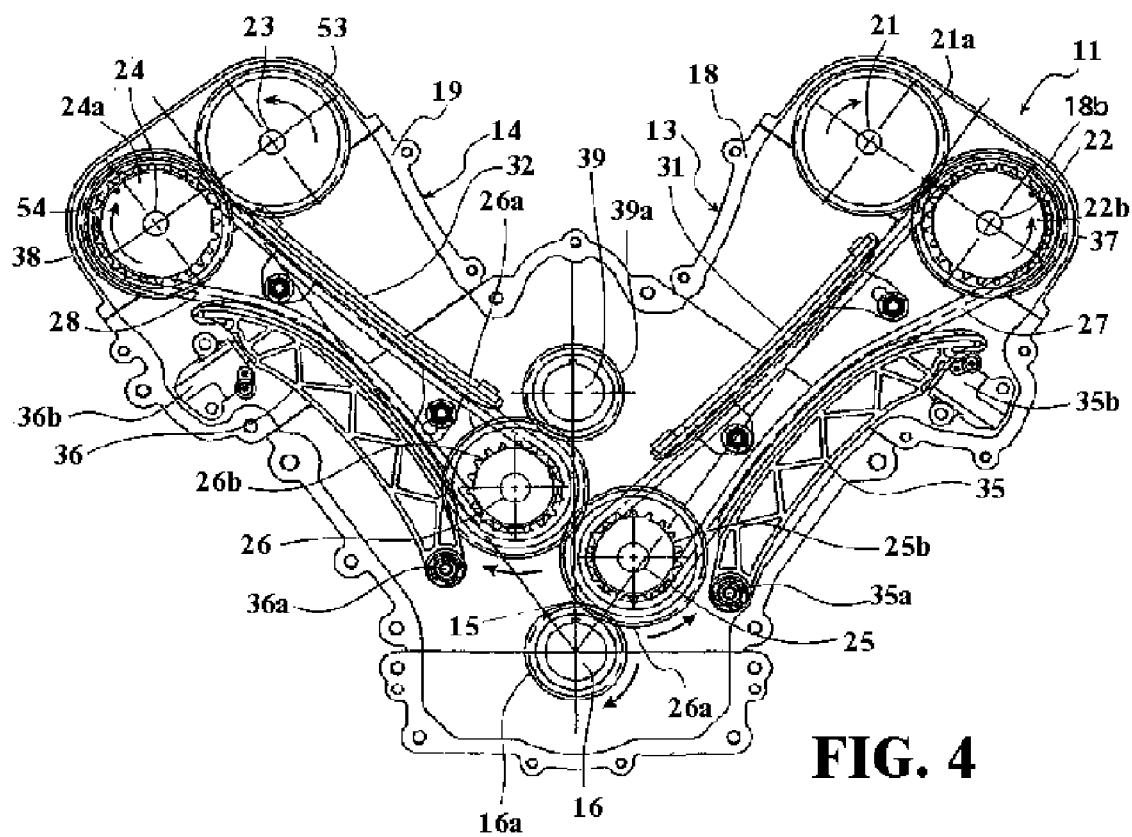
FIG. 4 is a cross sectional view, in part similar to FIGS. 1 and 2, and shows a third embodiment of the invention.

Embodiment of FIG. 4

FIG. 4 shows still another embodiment of the invention. In many ways the components of this embodiment are the same as those previously described in detail and/or perform like functions. Where that is the case, like components are identified by the same reference numerals and will be described again only as is necessary to permit those skilled in the art to practice this embodiment of the invention. Basically this embodiment is like the embodiment of FIG. 2 in that only one camshaft of each bank 13 or 14 is directly driven from the crankshaft 12 by a chain or belt. The remaining bank camshaft is gear driven by the chain or belt driven camshaft.

In this embodiment, the exhaust camshafts 22 and 24 of each bank 13 and 14 are driven by the crankshaft 16 through the crankshaft gear 16*a* with the exhaust camshaft 22 of the bank 13 being driven directly and the exhaust camshaft 24 of the bank 14 being driven from the gear 25*b* through its gear 24*b*.

Accordingly, the valve operating camshafts 21, 22, 23, and 24 are adapted to rotate in the direction opposite to that in embodiment of FIG. 2 by means of the respective timing drive chains 27 and 28 (see the arrows in FIG. 4). Hence, the average cam driving torque at low speed rotation can be made small in the rocker arm valve system of the inner pivot layout, which proves advantageous in terms of the VVT (Variable Valve Timing) actuation performance of a variable valve timing mechanism.

Figure 5:
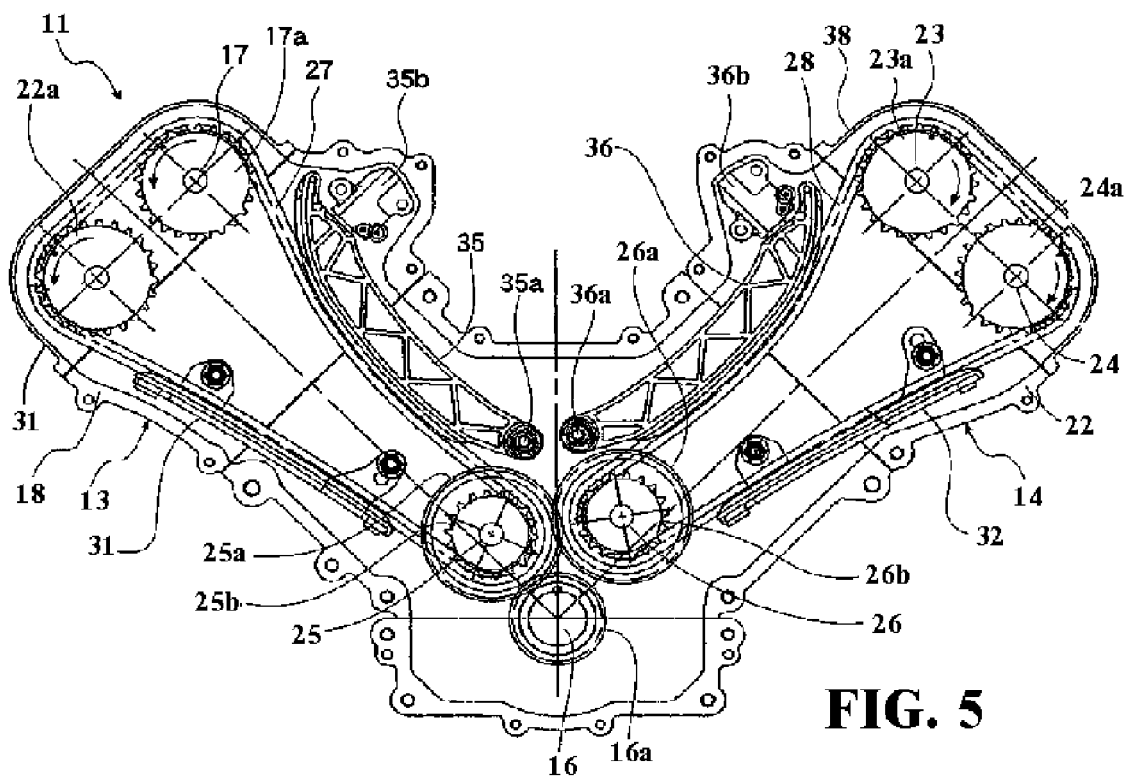
FIG. 5 is a cross sectional view, in part similar to FIGS. 1, 2 and 4 and shows a forth embodiment of the invention.

Embodiment of FIG. 5

This embodiment is somewhat similar to the embodiment of FIG. 1 and again where its components are the same or substantially similar they have been identified by the same reference numerals and will be described again only so that those skilled in the art will be able to practice this embodiment.

In this embodiment bank portions 13 and 14 are reversed. Thus the first bank portion 13, the first valve operating camshafts 21 and 22, the first idler shaft 25, and the first timing drive chain 27 are provided on the left-hand side of the V-engine. The second bank portion 14, the second valve operating camshafts 23 and 24, the second idler shaft 24, and the second timing drive chain 28 are provided on the right-hand side.

Rather than being positioned between the banks, as before, the first and second guide portions 31 and 32 are provided on the outer sides of the bank portions 13 and 14. Thus the first and second tensioners 35 and 36 are provided on the inner sides of the bank portions 13 and 14, respectively.

As a result, the first and second tensioners 35 and 36 are both provided on the inner sides in a wider wide-angle V-engine 11, and the urging devices 35*b* and 36*b* and the like can be operated from above to achieve an improvement in operability. In other regards the construction and operation is as described above.

Thus from the foregoing description it should be readily apparent that the described embodiments offer a greater variety of layouts for V type engines that improve performance and durability while effectively driving the overhead cam shafts and if desired a balancer shaft while at the same time insuring a longer life and servicing for the flexible transmitters and their associated components.

What is claimed is:

1. A V configuration internal combustion engine comprised of a pair of angularly disposed cylinder blocks each having at least one cylinder bore in which a respective piston is supported for reciprocation, the axes of said cylinder bores intersecting at an axis at one end of said cylinder bores, a crankshaft journalled for rotation about said axis and driven by connecting rods connecting said pistons to said crankshaft, first and second valve operating shafts disposed on opposite sides of a plane containing said axis for operating valves associated with respective ones of said cylinder bores and driven by said crankshaft, at least two poppet valves associated with each cylinder bore disposed on opposite sides of the respective cylinder bore, one of said valve operating shafts drives the cam shafts of one cylinder head and the other of said valve operating shafts drives the cam shafts of the other cylinder head, one of said valve operating shafts is driven directly from said crankshaft and the other of said valve operating shafts is driven by said one operating shaft.

2. A V configuration engine as set forth in claim 1 wherein a single drive drives each of the camshafts of the respective cylinder head from the respective valve operating shaft.

3. A V configuration engine as set forth in claim 1 wherein a single drive drives only one of the camshafts of the respective cylinder head from the respective valve operating shaft and a further drive drives the other cam shaft from the said one camshaft.

4. A V configuration engine as set forth in claim 1 wherein the drive ratio between the crankshaft and the one valve operating shaft is not unitary and the drive ratio bet seen the valve operating shafts and the cam shafts is not unitary and the respective drive ratios are set such that the camshafts rotate at one half crankshaft speed.

5. A V configuration engine as set forth in claim 4 wherein the drive ratio between the crankshaft and the one valve operating shaft is one of 1:2, 2:3, 3:4, 4:5 and 5:8.

6. A V configuration engine as set forth in claim 1 further including a balancer shaft driven at crankshaft speed and in a direction opposite thereto by one of the cam shaft drives.

7. A V configuration engine as set forth in claim 6 wherein the balancer shaft rotates about an axis that lies in the plane.

8. A V configuration engine as set forth in claim 7 wherein the axes of the valve operating shafts lie on opposite sides of the plane.

9. A V configuration engine as set forth in claim 8 wherein the axes of the valve operating shafts are positioned vertically between the crankshaft and balancer shaft axes.

10. A V configuration engine as set forth in claim 1 wherein the other cam shaft of each cylinder head is driven directly by the cam shaft driven by the valve operating shaft.

11. A V configuration engine as set forth in claim 1 wherein the cam shafts of each cylinder head both rotate in the same direction.

12. A V configuration engine as set forth in claim 1 wherein the cam shafts of each cylinder head rotate in opposite directions.

13. A V configuration engine as set forth in claim 1 wherein each cam shaft of the respective cylinder head is journalled over the associated cylinder bore by a cam carrier affixed to said respective cylinder head.

14. A V configuration engine as set forth in claim 13 wherein rocker arms are pivotally carried by the cam carriers and transmit the operating movement from the cam shaft cams to the associated valves.

* * * * *